Oct. 1, 1957 T. G. BOWERS 2,808,326
METHOD OF MELTING FERROUS METALS
Filed Dec. 23, 1953
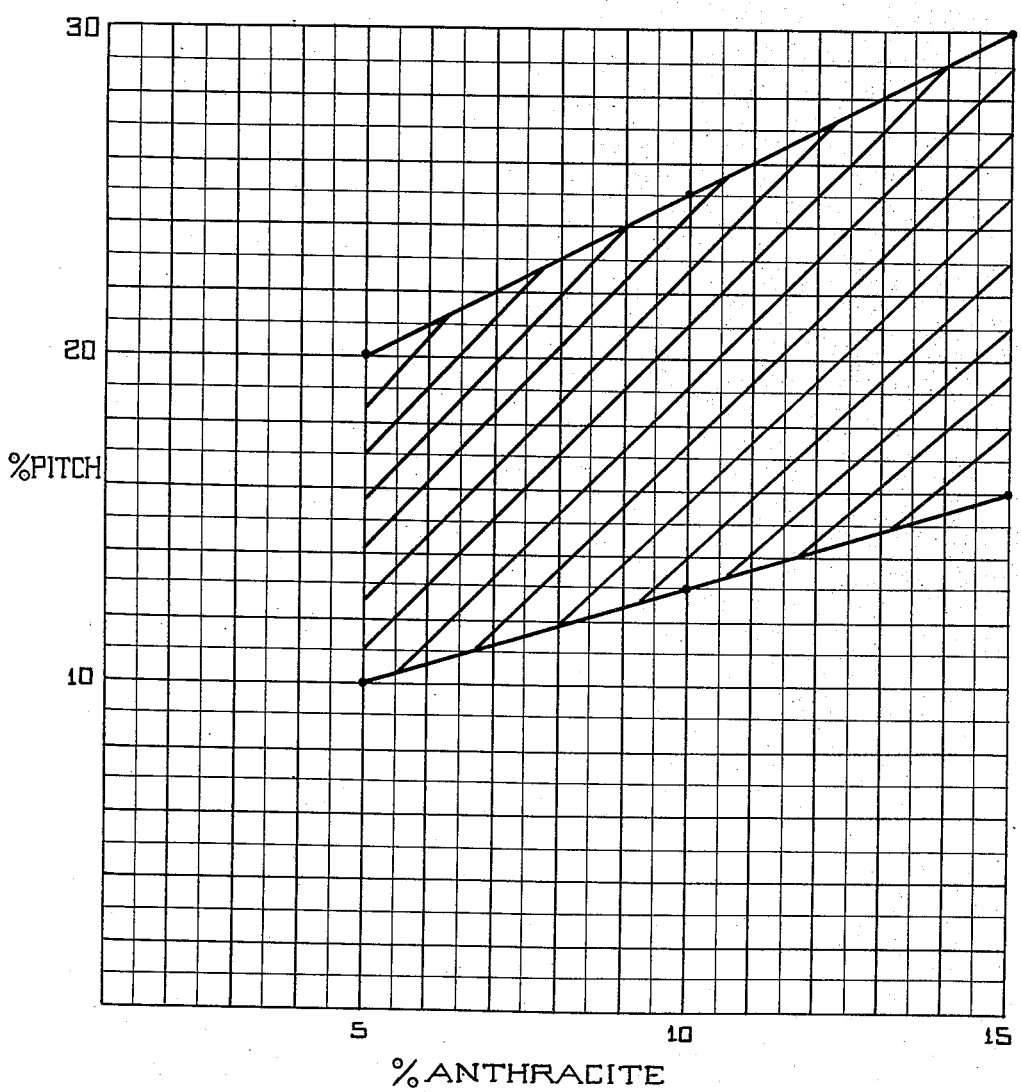
Inventor:
Thomas G. Bowers
By: Carl F. Peters
Attorney

United States Patent Office

2,808,326
Patented Oct. 1, 1957

2,808,326

METHOD OF MELTING FERROUS METALS

Thomas G. Bowers, Palatine, Ill., assignor to Great Lakes Carbon Corporation, New York, N. Y., a corporation of Delaware Application December 23, 1953, Serial No. 400,053

6 Claims. (Cl. 75—43)

This invention relates to a process for the melting of ferrous metals and ferrous alloys. More particularly, this invention relates to a method for melting ferrous metals whereby a charge comprising a particular type of foundry coke and ferrous metals is heated in any suitable device in order to melt the metal, the heat for the melting operation being supplied by oxidation of the coke.

This application is a continuation-in-part of my co-pending application, Ser. No. 350,217, filed April 21, 1953, now abandoned, for "Metallurgical Process."

One of the most widely used methods for manufacturing cast iron, grey iron or other ferrous metals and alloys involves the use of a device known as a cupola. Briefly, a cupola is a furnace of the vertical shaft type consisting of a cylindrical shell usually of boiler plate, the shell being lined with refractory. Cupolas may vary in size such as 18 inches to 84 inches I. D. In order to provide sufficient heat to melt the metal charged to the cupola, air must be admitted into the shaft furnace. The air is either at room temperature or may be preheated as desired and is admitted into the cupola through a wind box and tuyeres. An iron or metal charging door is positioned in the side of the stack usually from 16 to 22 feet above the bottom. Melting stock and fuel are introduced into the cupola through this charging door. Near the bottom of the shaft and generally on opposite sides thereof are positioned holes or spouts for the tapping of molten metal and slag. In some cupolas, slag is removed through the metal spouts.

In operation, the bottom of the shaft is filled with coke to form a bed. The coke bed heated above the tuyeres will be between 20 to 80 inches. This is ignited after which charges of coke, fluxing agents and melting stock (pig iron, scrap steel, etc.) are introduced until the stack contains the desired number of charges or it is level with the charging door. In charging the cupola a layer of limestone, soda ash, feldspar or other flux is placed on top of the coke bed followed by a charge of metal, a charge of coke and another charge of flux, etc. The flux charge is usually about 20% by weight of the coke charge. Air is introduced into the coke bed through the tuyeres and the heat produced by the combustion of the coke causes the metal to melt and flow down through the coke to the bottom of the shaft. The slag which is formed by the action of the flux on the ash of the coke and other impurities in the charge floats off through the slag tap hole. The heating cycle will vary in length, for example from 1 to 16 hours. The ratio of iron to coke with conventional foundry coke is between 4 to 1 and 10 to 1. When employing the coke required in practicing the present invention, metal to coke ratios as high as 20 to 1 have been realized.

Further details of the construction and operation of standard cupolas is found in the "Handbook of Cupola Operations" (1946), published by American Foundryman's Association.

Foundry coke has been produced almost entirely from selected bituminous coals in what is known in the trade as by-product or beehive coking ovens. Various coals of low or high volatile content are ground and blended to provide a more or less uniform or homogeneous mixture which is then placed in the coking apparatus. Beehive oven coke is produced in circular ovens which are normally 12 feet in diameter, the blended coals being charged to a depth of up to 24 inches. Heat for coking is supplied mainly by the combustion of volatile matter from the coals and expansion during carbonization is unrestricted. At the present time a very small percentage of metallurgical coke is made in this manner because of its high porosity. By-product coke is made in batteries of 30 to 75 ovens. Each oven is about 40 feet long, 10 to 14 feet high and 16 to 20 inches wide. The ovens are erected parallel to each other and are heated by combustion of gases in flues placed between each oven. The ovens are charged with from 10 to 20 tons of the coal mixture through top ports, closed tightly and subjected to indirect heat by maintaining flue temperatures between 1800° to 2200° F. Coking temperatures are controlled by careful regulation of the combustion of the gases in the flues which assures even heating and uniform coke quality. The heating cycle may be anywhere from 15 to 30 hours depending upon the flue temperatures, type of coal and properties desired in the final coke.

Foundry coke normally produced in by-product ovens is made by coking a blend of high and low volatile bituminous coals; the types, number and amounts of the components are selected according to the ultimate properties desired in the coke. The resulting coke is usually high in ash content (8 to 10%), the porosity is usually greater than 50% and has shatter values of 90%+2 inches and 70%+4 inches. The apparent specific gravity is normally less than 1.0. When used in a cupola to melt mixtures of scrap, pig iron, etc. and other components normally used in the manufacture of various metals, this coke has a considerable reactivity towards $CO_2$ and $H_2O$ vapor in that the flue gases will contain appreciable quantities (from 10 to 20% by volume) of CO. Since oxidation of the coke by $CO_2$ and $H_2O$ vapor is an endothermic reaction this detracts from the efficiency of the cupola. Furthermore, additional coke may be added to the charge to compensate for this type of oxidation which reduces the throughput or melting rate of the cupola.

A few attempts have been made to introduce raw petroleum coke into bituminous coal mixtures in by-product oven practice. For example, from 5 to 15% by weight of petroleum coke has been mixed with coking coals. While the resulting cokes have been useful as fuel they fall far short of specifications for metallurgical purposes. Several attempts have also been made to manufacture coke in by-product ovens from a mixture of raw petroleum coke and coal tar pitch. The resulting cokes have a distinct "fingery" structure, are not resistant to rough handling, and fall far short of cupola practice specifications on shatter and hardness values. The same is true for the coke which has been produced in the so-called Knowles oven from a mixture of raw petroleum coke (75 to 95%) and coking coal (25 to 5%).

It is an object of this invention to provide a method for the melting of various metals in foundry practice by using the novel coke herein described.

It is a further object of the invention to substantially reduce coke consumption and increase melting rates and cupola capacity when melting ferrous metals in a cupola.

It is a further object of the invention to employ a novel type of coke for the melting of metals which will improve the fluidity of the molten metal and reduce the incidence of trapped gases in the final product.

It is a further object of the invention to employ a novel type of coke for the melting of metals which will provide greater quantities of heat per ton of coke in the melting apparatus.

It is a further object of the invention to provide a method for the melting of ferrous metals whereby the carbon content of the final product may be increased without impairing other properties of the metal, such as hardness, tensile strength, etc.

It is a further object of the invention to provide a novel method of melting ferrous metals in a cupola whereby the concentration of carbon monoxide is substantially reduced over that which is observed in the operation of a cupola employing conventional foundry coke.

The above objects as well as others which will become apparent upon understanding the invention as herein described are realized by preparing a charge of ferrous metals such as pig iron, scrap iron, foundry returns and alloying elements, if desired, and a coke whose properties will be subsequently described herein. If desired, a suitable fluxing agent may be incorporated into the charge in order to reduce the melting point of slag which is formed by oxides of metals and other impurities present in the charge. The composite charge is then heated in air in order to ignite the coke and air is passed through the charge to effect combustion of the coke thereby liberating sufficient heat to melt the metal or alloy components of the charge.

By conducting the novel process herein described with a particular type of coke, the properties of which will be described herein, I have found that it is possible to increase the melting rate of the metal by as much as twofold over what is observed when employing standard foundry coke. Furthermore, the carbon content of the final metal product is substantially increased without impairing other properties of the metal such as hardness, tensile strength, silicon and manganese content, etc. Also, a marked reduced occlusion of gases in the final metal product has been observed, this being presumably due to the substantially reducing conditions in the melting zone of the cupola. This is also borne out by the fact that the final metal product evidences a considerably lower percentage of $Fe_2O_3$. Also, greater fluidity of the metal as it leaves the cupola has been observed even though the spout temperature may be below regular practice.

In order to form the novel metallurgical or foundry coke, which is essential to the operation of the process claimed herein, a carbonaceous mixture is formed whose components are (a) a major portion of petroleum coke having a volatile content between about 5 and about 14% by weight; (b) between about 5 and about 15% by weight of anthracite; (c) between about 10 and about 30% of a hydrocarbon pitch; (d) the balance or remainder of the components comprising essentially a swelling bituminous coal having a volatile content between about 14 and about 22%. The major portion of this mixture, and preferably 90%, should pass a ¼" screen.

The above mixture is placed in a by-product oven whose design is described in the Coking Section of the "Encyclopedia of Chemical Technology," vol. 3, pages 157–167, The Interscience Encyclopedia, New York, 1949. The oven is normally loaded through the top port with the coal mixture filling the oven to about three-fourths of its height. The mixture is then coked in indirect heat generated by the combustion of gases in the flues, the interior of the ovens being at temperatures of between about 1800° to 2200° F. The coking cycle will usually depend mainly upon the ultimate properties desired in the coke and upon the temperatures of the flues. Thus at a final oven temperature of 1800° F. the cycle will require from between about 20 to 25 hours and at 2200° F. will require between 18 to 20 hours.

The petroleum cokes employed in producing the metallurgical coke which is essential to the operation of the invention claimed herein result from the thermal cracking of heavy petroleum residues such as reduced or topped crudes, thermally cracked recycle stocks, etc. The coking is normally conducted in a vertical cylindrical drum such as those manufactured by Kellogg, Lummus and Foster Wheeler companies. The heavy hydrocarbons are admitted into the drum at a temperature between 900° and 1000° F. and are permitted to soak and carbonize until the drum is nearly filled with a solid coke. This material is removed from the drum by various decoking methods as known to the art. I may also employ petroleum coke made from so-called fluidized coking operations wherein a heavy petroleum residue is passed through a fluidized bed of finely divided carbon or petroleum coke particles at temperatures between 850° to 1000° F. whereby coke deposits on the surface of the fluidized particles which are periodically drawn from the fluidized unit according to their particle size. I may also employ petroleum coke of the type manufactured according to the process described in U. S. Patents Nos. 2,526,696; 2,561,420; 2,600,078 and 2,609,332.

Normally, the volatile content of petroleum coke will be between about 5 to about 14% by weight and more usually between 8 to 12%.

The hydrocarbon pitch which is an essential ingredient in the manufacture of the coke required in practicing this invention may be derived either from coal tar or petroleum sources and should have a specific gravity of 1.15 or higher. Coal tar pitch is produced by straight or vacuum distillation of tar recovered in by-product oven practices. Petroleum pitches are prepared by thermal distillation at atmospheric or reduced pressures of heavy petroleum hydrocarbons, especially highly cracked recycle stocks consisting of high boiling material recovered in reforming operations. The coal tar or petroleum pitch should preferably have a melting point (ball and ring) between 300° and 400° F. since these materials have a higher coke residue and improved bonding properties. I have also discovered that it is essential to the realization of satisfactory and acceptable physical properties of the coke that the ratio of pitch:anthracite be kept within certain limits, namely between about 4 to 2:1 and 2 to 1:1 at the 5 and 15 percent anthracite, levels, respectively, the amount of pitch increasing progressively and substantially uniformly within the limits of this ratio as the percent of anthracite in the mixture is increased from 5 up to 15%. This is shown clearly in the accompanying drawing.

In the drawing, percent anthracite is plotted against percent pitch, these being two of the components of the carbonaceous mixture to be coked. It is seen that at the 5% anthracite level the mixture must contain from 10 to 20% by weight of pitch, or a ratio of 4 to 2:1 whereas at the maximum anthracite content, i. e. 15%, the mixture will require 15 to 30% by weight of pitch or a ratio of 2 to 1:1. In between the 5 and 15% anthracite levels, the amount of pitch to be added to the mixture is within the area circumscribed by the oblique lines.

The amount of pitch incorporated in the over-all carbonaceous mixture to be coked will depend somewhat upon the specific requirements of the end use of the coke and upon the specifications of plants where it will be used. Thus, a mixture high in pitch (but within the aforementioned prescribed pitch:anthracite ratio) will produce a harder, more dense coke but less resistant to impact, and the opposite result obtains at the lower pitch:anthracite ratios. I have found that coke of the greatest size and shatter resistance is produced from a carbonaceous mixture having a pitch:anthracite ratio of about 1.4:1.

Mixtures containing pitch:anthracite ratios outside the shaded area of the drawing are not encompassed by this invention and produce inferior cokes.

The bituminous coals employed in preparing the metallurgical coke used in this invention must have a volatile content between 14 to 22% by weight and preferably between 16 to 20%. Since it is desired to maintain the ash residue of the final coke at a low value, the ash content of the coal should also be low and will normally not be in excess of 7% by weight.

Between about 5 to 15% by weight of anthracite is required in the mixture to be coked. The use of anthracite has been found to increase the blockiness (increased portions of large sized pieces of coke) so essential to foundry coke. Again, the ash content of the anthracite should be as low as possible and will normally not exceed 15% by weight. Usually the size of the anthracite employed will be No. 5 Buckwheat. It is preferable to pulverize the anthracite to −100 mesh but pulverization to 25% −40 mesh will give good results.

The metallurgical cokes used in this invention will have a carbon content in excess of 95%; ash less than 5%; volatile matter less than ½%; porosity less than 50%, preferably less than 40%; shatter not less than 50%+4 inches and not less than 70%+2 inches; apparent density greater than 1.0 and usually about 1.25; and sulfur less than 1%.

In describing the metallurgical coke which is essential to the practice of this invention and the method for manufacturing the same, some definitions have been adopted which are as follows:

Apparent or bulk density of the coke is the weight in pounds per cu. ft. according to ASTM method D292-29.

Porosity or cell space is the ratio between the apparent and true specific gravities as determined by ASTM D167-24.

*Volatile matter (VM).*—This is exclusive of the moisture and free oil which would be removed by heating to temperatures of 400° to 500° F. Volatile matter is determined in a platinum crucible placed in electrically heated furnace maintained at temperatures of $$1742° F. \pm 36° F.$$

A one gram sample of dry −60 mesh coke is heated for seven minutes and the resulting weight-loss is termed volatile matter.

*Ash.*—Ash is the residue from a one gram sample of coke ignited in an oxygen atmosphere at about 1742° F.

*Combustibility.*—This is the rate of reaction of the coke with oxygen and is described herein in terms of flue gas analysis in cupola operation.

*Reactivity.*—The reactivity of coke toward carbon dioxide to produce carbon monoxide is determined by analysis of flue gas in cupola operation.

*Shatter.*—This is determined by ASTM D141-23 and consists of dropping approximately a 50 lb. sample of coke (+2″) four times upon a heavy steel plate from a height of 6 feet. A screen analysis is made of the broken material and the total percentage is used as an index of strength.

In a preferred embodiment of the invention, a metallurgical or foundry coke which is particularly suitable to the practice of this invention is manufactured by preparing a mixture of four components:

| | Percent by weight |
|---|---|
| Petroleum coke (8 to 12% VM) | 40 to 65 |
| Anthracite (12% ash) | 5 to 15 |
| Coal tar pitch (350° F. M. P.) | 10 to 30 |
| Bituminous coal (16 to 20% VM) | 10 to 20 |

The above components were ground so that 90% of the particles would pass a ¼″ screen. This mixture was charged in a deep bed into a vertical by-product coking oven and coked by indirect heat for 20 to 22 hours at a temperature between 1800° to 2200° F. The resulting coke had the following analysis:

| | |
|---|---|
| Free carbon | 96% by weight. |
| Ash | 3.0%. |
| Sulfur | 0.5%. |
| Volatile matter | 0.5%. |
| Shatter | 90%+2 inches; 70%+4 inches. |
| Porosity | 35%. |

In a further embodiment of the invention foundry coke is manufactured by preparing a substantially uniform blend of the following components:

| | Percent by weight |
|---|---|
| Petroleum coke (10 to 12% VM) | 50 to 55 |
| Coal tar pitch (330° F. M. P.) | 10 to 15 |
| Pocahontas coal (bituminous, 18% VM) | 20 to 25 |
| Anthracite | 11 to 13 |

The above components were ground so that 90% of the particles would pass a ¼″ screen. This mixture was then charged in a deep bed into a vertical by-product coking oven and coked by indirect heat for 22 hours at a temperature between 2000° to 2200° F. The resulting coke had the following analysis:

| | |
|---|---|
| Free carbon | 96% by weight. |
| Ash | 3.0%. |
| Sulfur | 0.4%. |
| Volatile matter | 0.6%. |
| Shatter | 92%+2 inches; 75%+4 inches. |
| Porosity | 35%. |

In preparing the above and similar carbonaceous mixtures to be coked, the petroleum coke should be the major component (by weight) and the total amount of pitch (coal tar or petroleum) and swelling bituminous coal should be either equal to or less than the weight of the petroleum coke in the mixture. If the amount of the petroleum coke is less than 40% of the total mixture, the beneficial results herein described are not realized. This is also true if the petroleum coke exceeds 65% by weight of the total mixture as in that event the shatter values fall below accepted specifications.

It is believed that the improved results in cupola practice are due to a combination of the physical and chemical properties of this novel coke including specifically: high density, low porosity and low ash. Since combustion is maximized and coke reactivity considerably reduced, the cupola operation is much more efficient resulting in higher melting rates. By employing the novel coke described herein it has been possible to reduce cupola coke requirements to as low as ⅓ that normally used, thereby permitting greater quantities of metal charge as compared to the amounts of coke and flux required.

In order to further describe the coke which is necessary to the practice of this invention, and its method of manufacture, the following examples are recited:

EXAMPLE I

The following components were ground to 90%—¼″ and thoroughly blended:

| | Percent by weight |
|---|---|
| Petroleum coke (12% VM) | 60 |
| Coal tar pitch (300° F. M. P.) | 14 |
| Bituminous coal (Pocahontas, 18% VM) | 18 |
| Anthracite (12% ash) | 8 |

The above mixture was coked in a vertical by-product oven while maintaining the flue temperatures between 2000° to 2200° F. over a 24-hour cycle. The coke resulting from this operation had the following analysis:

| | |
|---|---|
| Carbon | 96%. |
| Ash | 3.5%. |
| Sulfur | 0.5%. |
| Volatile matter | Less than 0.5%. |
| Shatter | 55% +4 inches; 72% +3 inches. |
| Apparent density | 1.20%. |

This coke was used in melting a mixture of pig iron, foundry returns, steel scrap, etc. in a cupola having a nominal diameter of 65″ at the tuyeres and 72″ in the melting zone. A coke bed of about 6000 pounds was used. Normal iron to coke ratios in this particular cupola are 6 to 1, each metal charge being 1 ton. It was found that the iron to coke ratio could be increased to as high as 18 to 1 by employing the novel coke described above thereby increasing the melting rate of the cupola from a normal rate of 17 tons up to 23 tons per hour. Temperatures at the metal spout were between 2750° to 2800° F. The carbon content of the metal averaged 3.5 to 3.7% as compared to values of 3.1 to 3.2% for normal foundry coke. Photomicrographs of the melt samples showed higher percentages of graphite inclusion but the density and other physical properties of the metal were not lowered indicating a better distribution of the graphite throughout the metal than in the case of high carbon iron produced with regular foundry coke.

Flue gas analyses were obtained throughout this run and the concentration of CO averaged about 6.0% by volume. This is to be contrasted with a CO analysis in normal foundry practice which averages between 11 to 12% by volume. This at least partially explains the outstanding results obtained and the observed increase of iron to coke ratios.

In preparing the carbonaceous mixtures to produce the coke used in the invention, I regulate the quantity of the pitch component according to the amount of anthracite present, or vice versa. The pitch tolerance and requirement of the mixture increases, within defined limits, as the amount of anthracite increases from 5 up to 15% by weight of the total mixture. Thus, for a mixture containing 5% anthracite, from 10 to 20% of pitch can be used; similarly—

| Percent Anthracite | Percent Pitch | Pitch: Anthracite Ratio |
| --- | --- | --- |
| (5) | (10 to 20) | (4-2:1) |
| 10 | 10 to 25 | 2.5-1:1 |
| 15 | 15 to 30 | 2.0-1:1 | are typical ratios of pitch to anthracite which are required.

Additional samples of metallurgical coke were prepared for use within the scope of this invention with the following mixtures:

Table I

| Ex. No. | Pet. Coke | | Bit. Coal | | Coal Tar Pitch | | Anthra., percent | Pitch: Anthra. Ratio |
| --- | --- | --- | --- | --- | --- | --- | --- | --- |
| | Percent | VM | Percent | VM | Percent | M.P., °F. | | |
| 2 | 45 | 12 | 25 | 20 | 20 | 400 | 10 | 2:1 |
| 3 | 50 | 8 | 25 | 20 | 17 | 400 | 8 | 2.1:1 |
| 4 | 60 | 10 | 17 | 18 | 15 | 350 | 8 | 1.9:1 |
| 5 | 70 | 12 | 13 | 16 | 10 | 350 | 7 | 1.4:1 |
| 6 | 75 | 10 | 10 | 15 | 10 | 300 | 5 | 2:1 |

The components in each of the above examples were ground so that the majority of the particles would pass a ¼" screen and to produce an intimate mixture of the components. The coking operation was similar to that described in Example I. All of the cokes produced in Examples 2 to 6 show improved characteristics in cupola operation and permitted increased iron to coke ratios and higher melting rates. All of these cokes had a porosity less than 50%, usually 35 to 40%; volatile matter was less than 1.0%; shatter more than 80% +2 inches and more than 60% +4 inches; ash less than 4%. All of the cokes showed a reactivity considerably lower than that observed in normal foundry coke practices even when mixing low volatile and high volatile coals with small proportions of anthracite fines.

Having thus described the invention with particularity, but without intention of being limited to the exact details expressed herein but only by the scope of the appended claims, what is desired to be secured by Letters Patent is:

1. In a metallurgical process as herein described for melting ferrous metals wherein a charge comprising foundry coke and ferrous metals is heated to melt said metals by oxidation of said coke, the method of improving the melting rate, fluidity, carbon content and tensile strength of the metal thus produced, which comprises replacing at least a portion of said coke with a coke formed by coking in a narrow, vertical coking zone by indirect heat at a temperature between about 1800° and about 2200° F. an intimate mixture comprising essentially a major portion of petroleum coke having a volatile content between about 5 and about 14% by weight; between about 5 and about 15% by weight of anthracite; an essentially hydrocarbon pitch binder in amounts between 4 to 2:1 and 2 to 1:1 (pitch:anthracite ratios) based upon the amount of said anthracite, at the 5 and 15% levels, respectively, the amount of pitch within said ratios increasing as the amount of anthracite in said mixture increases, and the balance a swelling bituminous coal having a volatile content between about 14 and 22% by weight, the major portion of the particles of said mixture passing a ¼" screen.

2. The method of claim 1 wherein the pitch employed in manufacturing the coke is coal tar pitch having a melting point between about 300° to 400° F.

3. The method of claim 1 wherein the pitch employed in manufacturing the coke has a melting point between about 300° to 400° F.

4. The method according to claim 1 wherein the petroleum coke and the bituminous coal employed for the manufacture of the coke have a volatile content between about 8 to 12%, and between about 16 to 20%, by weight, respectively.

5. In a metallurgical process as herein described for melting ferrous metals wherein a charge comprising foundry coke and ferrous metals is heated to melt said metals by oxidation of said coke, the method of improving the melting rate, fluidity, carbon content and tensile strength of the metal thus produced which comprises employing a coke resulting from coking a deep bed of a carbonaceous mixture in a narrow vertical coking zone by indirect heat at a temperature between about 1800° and about 2200° F., said carbonaceous mixture consisting essentially of an intimate mixture of from 40 to 65% by weight of petroleum coke having a volatile content of about 8 to 12% by weight; between about 5 to 15% of anthracite; an essentially hydrocarbon pitch binder in amounts between 4 to 2:1 and 2 to 1:1 (pitch:anthracite ratios) based upon the amount of said anthracite, at the 5 and 15% levels, respectively, the amount of pitch within said ratios increasing as the amount of anthracite in said mixture increases, and about 10 to 30% of a swelling bituminous coal having a volatile content between about 16 to 20%, more than 90% of the mixture passing a ¼" screen.

6. In a metallurgical process as herein described for melting ferrous metals wherein a charge comprising foundry coke and ferrous metals is heated to melt said metals by oxidation of said coke, the method of improving the melting rate, fluidity, carbon content and tensile strength of the metal thus produced which comprises employing coke manufactured by heating a deep bed of a carbonaceous mixture in a narrow vertical coking zone by indirect heat at a temperature between about 1800° and 2200° F., said carbonaceous mixture consisting essentially of an intimate mixture of a major portion of petroleum coke having a volatile content between about 5 and about 14% by weight; between about 5 and about 15% by weight of anthracite; an essentially hydrocarbon pitch binder in amounts between 4 to 2:1 and 2 to 1:1 (pitch:anthracite ratios) based upon the amount of said anthracite, at the 5 and 15% levels, respectively, the amount of pitch within said ratios increasing as the amount of anthracite in said mixture increases, and a swelling bituminous coal having a volatile content between about 14 and 22%, the total amount of pitch and bituminous coal being less than the weight of the petroleum coke in the mixture, the major portion of the particles of said mixture passing a ¼" screen.

References Cited in the file of this patent

UNITED STATES PATENTS

| | | |
|---|---|---|
| 1,357,780 | Koppers | Nov. 2, 1920 |
| 1,546,521 | Vanderstein | July 21, 1925 |
| 2,177,226 | Rice | Oct. 24, 1939 |
| 2,640,016 | Martin | May 26, 1953 |

OTHER REFERENCES

Handbook of Cupola Operation, pages 279 to 283. Published in 1946 by the American Foundryman's Association, Chicago, Ill.